(No Model.)
H. W. SISSON.
HALTER.
No. 462,743. Patented Nov. 10, 1891.
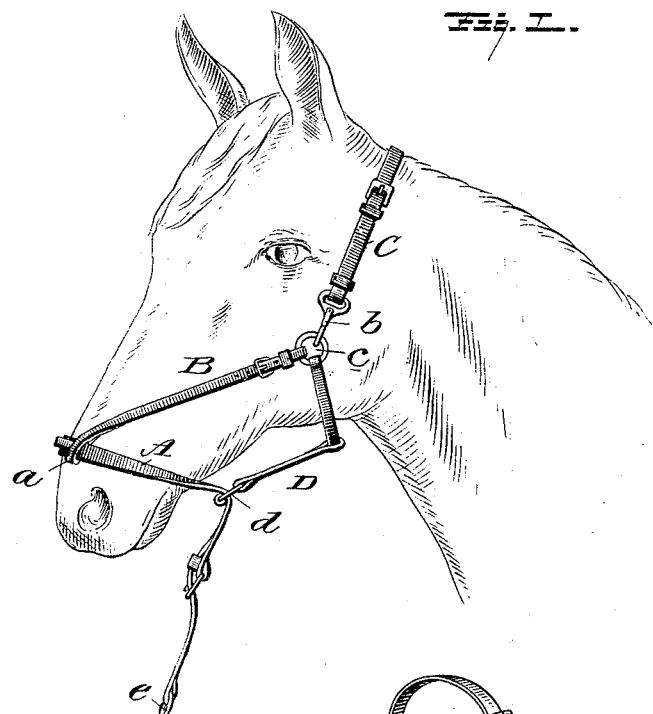
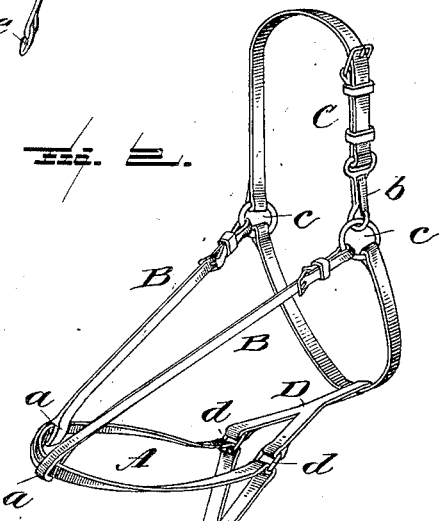
Witnesses
L. C. Hills.
P. G. Eldridge.
Inventor
Harry W. Sisson,
per Chas. H. Fowler
Attorney

UNITED STATES PATENT OFFICE.

HARRY W. SISSON, OF MONMOUTH, ILLINOIS.

HALTER.

SPECIFICATION forming part of Letters Patent No. 462,743, dated November 10, 1891.

Application filed February 24, 1891. Serial No. 382,467. (No model.)

*To all whom it may concern:*

Be it known that I, HARRY W. SISSON, a citizen of the United States, residing at Monmouth, in the county of Warren and State of Illinois, have invented certain new and useful Improvements in Halters; and I do hereby declare that the following is a full, clear, and exact description of the same, reference being had to the annexed drawings, making a part of this specification, and to the letters of reference marked thereon.

This invention relates to certain new and useful improvements in halters; and it has for its objects, among others, to provide an improved halter, which will prevent the animal from pulling at the halter and cure him of balking.

It has for a further object to so construct the halter that it will not draw across the bridge of the nose, but below it, so that when tightened by pulling it will stop the animal from breathing, and thus he can be easily controlled.

I provide a divided chin-tug to enable the nose-band when tightened to prevent the breathing of the animal without pressing the jaws together. I provide adjustable cheeks, which are connected to the nose-band by loops.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a side elevation showing my improved halter in place upon a horse. Fig. 2 is a perspective view of the halter itself.

Like letters of reference indicate like parts in both views.

Referring now to the details of the drawings by letter, A designates an adjustable nose-band, to which the cheeks B are connected near the nostrils, the said cheeks being formed with loops $a$, which embrace the nose-band at this point, as shown, the said cheeks being adjustably connected with the main portion C of the halter, which encircles the neck of the animal, as seen in Fig. 1. This neck portion is adjustable, and one portion is provided with a snap-hook $b$, designed to engage a ring or analogous provision $c$ on the other part, as shown.

The nose-band passes around the nose below the bridge thereof, as seen in Fig. 1, and through loops or analogous provisions $d$ at the forward end of the chin-tug D, which is attached to the under part of the collar portion and is bifurcated or divided, as seen in Fig. 2. The two ends of the nose-band are united and adjustably held by means of a suitable buckle, as seen in Fig. 2, the free end being provided with a ring $e$.

The nose-band is not connected with the collar or throat portion of the halter and can be tightened independent thereof, so that when the nose-band is pulled upon by the tie-strap, which is designed to be connected with the ring at the free end thereof, it will press or pull against the nostrils of the animal and stop him from breathing. The loops of the cheeks, which embrace the nose-band, press against the nostrils, as will be seen, and aid in controlling the horse.

The device is simple, readily applied, and in practice has proved most efficient and durable for the purposes for which it is intended.

What I claim as new is—

The improved halter described, consisting of the two-part adjustable throat-piece, the cheeks adjustably connected therewith, and having loops, the nose-band adapted to bear upon the nostrils below the bridge of the nose and passed loosely through the loops of the cheeks, and the divided chin-tug independent of the nose-band connected with the throat-piece and having loops at their forward ends, the ends of the nose-band being passed loosely through said loops united adjustably and the free end provided with a ring, substantially as and for the purpose specified.

In testimony that I claim the above I have hereunto subscribed my name in the presence of two witnesses.

HARRY W. SISSON.

Witnesses:
T. D. GORDON,
J. W. HAMILTON.